United States Patent Office 2,984,671
Patented May 16, 1961

2,984,671

CYANOPYRROLIDINONES

Newman M. Bortnick, Oreland, and Marian F. Fegley, Mont Clare, Pa., assignors to Rohm & Haas Company, Philadelphia, Pa., a corporation of Delaware No Drawing. Filed May 14, 1958, Ser. No. 735,107

3 Claims. (Cl. 260—325)

This invention deals with cyanopyrrolidinones as new compositions of matter. It further deals with a method for the preparation of these cyanopyrrolidinones.

The present compounds are prepared by reacting specific pyrrolinones with hydrocyanic acid. The present reaction may be conducted at atmospheric pressure in the temperature range of about 0° to 100° C. or under superatmospheric pressure at temperatures as high as 325° C. At high temperatures, the ambient pressure must be sufficient to maintain the reactants in the liquid phase. It may be conducted in neutral, acidic, or basic medium. The meduim which is preferred will depend upon the nature of the substituent attached at the 1-position. When the present reaction is conducted in the presence of a cyanide ion generating catalyst, the catalyst is employed preferably in amounts of about 0.1 to 20% by weight of the total weight of the reactants. Suitable as a catalyst are alkali metals and their carbonates, the lower alkoxides, oxides, hydroxides, peroxides, and cyanides of the alkali metals and alkaline earth metals, tertiary amines, and quaternary ammonium bases. Actually there may be employed as catalyst any base whose aqueous 0.1 molar solution has a pH of about at least 9. Typical examples of the catalyst that may be used are sodium, potassium, lithium, sodium methoxide, potassium butoxide, lithium ethoxide, magnesium ethoxide, sodium oxide, potassium hydroxide, calcium oxide, barium hydroxide, strontium hydroxide, sodium peroxide, magnesium peroxide, potassium cyanide, lithium cyanide, barium cyanide, magnesium cyanide, sodium carbonate, potassium carbonate, trimethylamine, triethylamine, triethanolamine, octyldimethylamine, N-methylmorpholine, benzyltrimethylammonium hydroxide, dibenzyl-dimethyl-ammonium hydroxide, dodecenyltriethylammonium hydroxide, and the like. The alkali metal cyanides are particularly effective for the instant purposes.

When an acid catalyst is employed, the catalyst may be added as a strong mineral acid; such as, for example, sulfuric acid, hydrochloric acid, nitric acid, perchloric acid, trifluoroacetic acid, trichloroacetic acid, phosphoric acid and the like, as an organic acid; such as oxalic acid, acetic acid, propionic acid, benzoic acid and the like; or as an acidic salt such as amine hydrochlorides, amine hydrobromides, amine sulfates, amine nitrates, ferric chloride, boron trifluoride, aluminum chloride, and the like.

Although the addition of HCN is more rapid in the presence of either acidic or basic catalysts, neutral systems are preferred when the parent pyrrolinones are derived from aminoalcohols. This is the case because, in the presence of acidic or basic catalysts the hydroxyl groups add to the pyrrolinone double bond either inter- or intramolecularly and the desired cyanopyrrolidinones are not obtained in good yields.

The catalyst may be added to the reaction mixture all at once or intermittently as desired. The hydrocyanic acid may be added all at once but preferably is introduced at a rate sufficient to maintain a constancy of reaction conditions. Also, both the catalyst and the reactants may be added all at once or intermittently as desired. The advantages of the above refinements will be apparent to one skilled in the art from the teachings of the present invention.

It is preferred to introduce the hydrocyanic acid to a mixture of the catalyst and the pyrrolinone at a gradual rate so that reaction occurs promptly after the two reactants and the catalyst meet under the defined conditions, preferably with the pyrrolinone in excess. Under such arrangements, there is substantially no polymerization of hydrocyanic acid and yields of the desired product are very high.

In the present invention, hydrocyanic acid may be introduced into the reaction mixture in either the gaseous or liquid state.

The rate of addition of hydrocyanic acid varies with the temperatures at which the reactions are carried out. When high temperatures are employed, reaction times may be shortened from hours to minutes, particularly when high molecular weight pyrrolinone starting materials are employed.

If desired, a solvent can be employed in carrying out the addition of hydrocyanic acid to the defined pyrrolinones. This solvent may be of the hydrocarbon type such as hexane, heptane, benzene, toulene and the like, or it may be selected from the class of secondary and tertiary alcohols, ethers, substituted amides, nitriles and halogenated hydrocarbons, as desired.

In some cases, it may be that the catalyst is not substantially or entirely soluble in the reaction system. In these instances particularly, it is desirable to agitate the reaction system such as by stirring or rocking in order to assure highest activity from the catalyst. Reactants in this invention, when combined in substantially equimolecular amounts, give cyano-pyrrolidinones in yields that consistently reach about 70% to 90%. At the conclusion of the reaction, the catalyst is neutralized by the addition of acid or base, depending on which type has been employed. The reaction mixture may then be filtered if desired and then distilled, preferably at reduced pressures.

In this invention, the pyrrolinone reactants employed may be represented by the formula

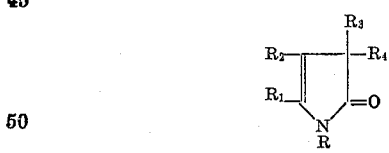

which may be prepared according to the method shown in copending application Serial No. 735,124, filed May 14, 1958.

The products correspond to the formula

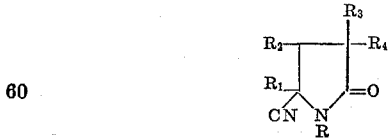

The symbol $R_1$ represents hydrocarbon groups of one to ten carbon atoms preferably alkyl, aralkyl, cycloalkyl, aryl and alkaryl. The symbol $R_2$ represents a hydrogen atom or an alkyl group of one to four carbon atoms. The symbols $R_3$ and $R_4$ may be a hydrogen atom or hydrocarbon groups containing from one to ten carbon atoms including alkyl, aralkyl, cycloalkyl, aryl and alkaryl groups. In addition, $R_1$ and $R_2$ taken together with the carbon atoms to which they are joined may form a carbocyclic ring containing five to six carbon atoms which in turn may have alkyl substituents containing a total of no more than four additional carbon atoms. In addition, $R_2$ and $R_3$ taken together with the carbon atoms to which they are joined may form a carbocyclic ring containing five to six carbon atoms which in turn may have alkyl substituents containing a total of no more than four additional carbon atoms. In addition, $R_3$ and $R_4$ taken together with the carbon atoms to which they are joined may form a carbocyclic ring containing five to six carbon atoms which in turn may have alkyl substituents containing a total of no more than four additional carbon atoms. The total number of carbon atoms in the groups $R_1$, $R_2$, $R_3$, and $R_4$ should not exceed 20. The preferred embodiments are those in which $R_1$ and $R_4$ are alkyl groups, $R_2$ is a hydrogen atom, and $R_3$ is a methyl group. $R_1$, $R_3$ and $R_4$ may typically individually represent methyl, butyl, octyl, benzyl, phenylbutyl, cyclopentyl, cyclohexyl, phenyl, naphthyl, butylphenyl groups, and the like.

The symbol R represents an alkyl group of one to eighteen carbon atoms, an alkenyl group of three to eighteen carbon atoms, an aryl group of up to ten carbon atoms, an aralkyl group of up to eighteen carbon atoms, an alkarylalkyl group of up to thirty carbon atoms, an alkoxyalkyl group of three to twenty-four carbon atoms, a hydroxyalkyl group of two to twelve carbon atoms, and an alkylaminoalkyl group of three to eighteen carbon atoms provided that the amino group is a secondary or tertiary structure, that is non-primary. Alkyl, in the above definition, is to be construed to include cycloalkyl and alkylcycloalkyl within the range of carbon atoms previously set forth.

Typical R representations are methyl, ethyl, butyl, octyl, decyl, dodecyl, octadecyl, cyclopentyl, cyclohexyl, butylcyclohexyl, octylcyclohexyl, butylcyclohexylethyl, propenyl, butenyl, hexenyl, octenyl, decenyl, dodecenyl, octadecenyl, phenyl, naphthyl, benzyl, phenylethyl, phenylbutyl, phenyldodecyl, methylphenyl, ethylphenyl, butylphenyl, octylphenyl, nonylphenyl, decylphenyl, hexadecylphenyl, octadecylphenyl, methylbenzyl, ethylbenzyl, butylbenzyl, octylbenzyl, dodecylbenzyl, butylphenylbutyl, octylphenylethyl, dioctylphenylethyl, dodecylphenyloctyl, methoxyethyl, methoxypropyl, methoxyhexyl, methoxydecyl, methoxyoctadecyl, ethoxyethyl, ethoxybutyl, ethoxyoctyl, ethoxydodecyl, propoxyethyl, propoxybutyl, propoxyheptyl, propoxytetradecyl, butoxyethyl, butoxybutyl, butoxyoctyl, butoxydodecyl, butoxyoctadecyl, pentoxyethyl, pentoxybutyl, pentoxydecyl, hexoxyethyl, hexoxyhexyl, hexoxydodecyl, hexoxyoctadecyl, heptoxyethyl, heptoxyoctyl, octoxyethyl, octoxybutyl, octoxyoctyl, octoxydodecyl, nonoxypropyl, nonoxyheptyl, nonoxytridecyl, decoxyethyl, decoxyoctyl, undecoxybutyl, dodecoxypropyl, dodecoxydecyl, dodecoxydodecyl, tridecoxybutyl, tetradecoxypropyl, pentadecoxypentyl, hexadecoxybutyl, heptadecoxyethyl, octadecoxyethyl, octadecoxyhexyl, hydroxyethyl, hydroxypropyl, hydroxybutyl, hydroxypentyl, hydroxyoctyl, hydroxydecyl, hydroxydodecyl, ethylaminoethyl, propylaminoethyl, butylaminopropyl, octylaminohexyl, hexylaminooctyl, heptylaminopentyl, octylaminooctyl, nonylaminoethyl, ethylaminononyl, decylaminopropyl, propylaminododecyl, dodecylaminoethyl, dodecylaminopropyl, dodecylaminobutyl, dodecylaminohexyl, N-methyl-N-ethylaminoethyl, N-propyl-N-ethylaminoethyl, N - butyl - N-pentylaminoethyl, N-octyl-N-hexylaminobutyl, and N-decyl-N-butylaminobutyl.

Typical pyrrolinone reactants include 1,2,4-trimethyl-2 - pyrrolin - 5 - one, 1,2,4 - trimethyl - 4 - (2,2 - dimethylpropyl)-2-pyrrolin-5-one, 1,4 - dimethyl - 2,4 - dihexyl - 2-pyrrolin-5-one and 1-methyl-3,3-pentamethylene-2,3,4,5 6,7-hexahydroindol-2-one, 1 - ethyl-2,4,4-trimethyl-2-pyrrolin - 5 - one, 1-ethyl-4-methyl-2,4-dipropyl-2-pyrrolin-5-one, 2 - ethyl - 3,7a - dimethyl-1,4,5,6,7,7a-hexahydroisoindol-1-one, 1-(2-phenylethyl)-2,4,4-trimethyl-2-pyrrolin-5-one, 1 - (2 - dimethylaminoethyl)-2,4,4-trimethyl-2-pyr- rolin-5-one, 1 - (2-methylaminopropyl)-2,4,4-trimethyl-2-pyrrolin-5-one, 1 - (6-diethylaminohexyl)-2,4,4-trimethyl-2-pyrrolin-5-one, 1 - (2-butylaminoethyl)-2,4-dimethyl-4-2-pyrrolin-5-one, 1 - (2-butylaminoethyl)-2,4-dimethyl-4-neopentyl-2-pyrrolin-5-one, 1 - (2-methyl-2-propylaminopropyl)-2,4-dihexyl-4-methyl-2-pyrrolin-5-one, 1 - (3 - dimethylaminopropyl) - 3,3 - pentamethylene - 2,3,4,5,6,7-hexahydroindol-2-one, 1 - (2 - diethylaminophenyl)-2,4,4-trimethyl-2-pyrrolin-5-one, 1 - (3-diethylamino-4-methylphenyl)-2,4-dihexyl-4-methyl-2-pyrrolin-5-one, 1 - (4 - dimethylaminophenyl) - 2,4,4-trimethyl-2-pyrrolin-5-one, 1-benzyl-2,4,4-trimethyl-2-pyrrolin-5-one, 1-p-tolyl-2,4,4-trimethyl-2-pyrrolin-5-one, 1,2,4,4-tetramethyl-2-pyrrolin-5-one, 1 - (3 - dimethylaminopropyl) - 2,4 - dimethyl-4-neopentyl-2-pyrrolin-5-one, 1-(3-methoxypropyl) - 2,4,4 - trimethyl-2-pyrrolin-5-one, 1 - (2 - hydroxyethyl) - 2,4,4-trimethyl-2-pyrrolin-5-one, 1 - (2 - hydroxypropyl)-2,4,4-trimethyl-2-pyrrolin-5-one, 1 - (3 - hydroxypropyl) - 2,4-dimethyl-4-ethyl-2-pyrrolin-5-one, 1-(2-hydroxyethyl) - 2,4-di-(2-methylpropyl)-4-methyl-2-pyrrolin-5-one, 1 - [2-(2-hydroxyethylamino)ethyl] - 3,3,6 - trimethyl - 2,3,4,5,6,7-hexahydroindol-2-one, 1 - (2-diethylaminoethyl)-2,4,4-trimethyl-2-pyrrolin-5-one, 1 - (2-methylaminoethyl)-2,4-dimethyl-4-hexyl-2-pyrrolin-5-one, 1-(2-butylaminopropyl)-2,4,4-trimethyl-2-pyrrolin - 5 - one, spiro{3,3 - dimethylbicyclo(2.2.1)heptane-2,4′-[1′-(2′ - ethylaminopropyl) - 2′-methyl-2′-pyrrolin - 5′ - one]}, 1 - butyl-2,4,4-trimethyl-2-pyrrolin - 5 - one, 1-dodecyl-2,4,4-trimethyl-2-pyrrolin-5-one, 1-phenyl-2,4,4-trimethyl-2-pyrrolin-5-one, 1-butyl-2,4-dibutyl-4-methyl-2-pyrrolin-5-one, and 1-benzyl-2,4-dibutyl-4-methyl-2-pyrrolin-5-one.

The products of this invention are useful as fungicides particularly when applied against *Monilinia fructicola* and *Stemphylium sarcinaeforme* when tested and evaluated according to standard methods. The present products may be hydrogenated to form the corresponding amino compounds which when reacted with dibasic acids give polyamide esters that impart improved dyeability to fibers made therefrom. The present products may also be hydrolyzed by heating with dilute sodium hydroxide solution to form the corresponding acids which may be used as terminating groups in polyamides to improve the dyeability of fibers made therefrom. The products of this invention are also useful as hypotensive agents in rats.

The products of this invention, as well as the method for their preparation, may be more fully understood from the following examples which are offered by way of illustration and not by way of limitation. Parts by weight are used throughout.

*Example 1*

Hydrogen cyanide (7 parts) is added dropwise to a solution of 1,2,4,4 - tetramethyl-2-pyrrolin-5-one (30 parts) in dimethyl formamide (25 parts) containing potassium carbonate (0.5 parts) at 85° C. At the end of the three hour reaction period, the temperature is increased to 142° C. The product (23 parts), (boiling point—72°–77° C. at 0.05 mm. absolute pressure and $n_D^{25}$ 1.4625), crystallizes on standing and has a melting point of 42°–48° C. Recrystallization from ether gives the pure product having a melting point of 48°–49° C. The product has the formula $C_9H_{14}N_2O$ and contains 64.98% carbon (65.03% theoretical), 8.71% hydrogen (8.49% theoretical), and 16.97% nitrogen (16.86% theoretical).

*Example 2*

Hydrogen cyanide (8.1 parts) is added dropwise to a stirred mixture of 1,2,4,4-tetramethyl-2-pyrrolin-5-one (30 parts) and pyridine hydrochloride (2 parts). The reaction temperature rises from 25° to 71° C. during the addition. After the exothermic reaction has subsided, the material is heated in an oil bath. After 6.5 hours, the temperature reaches 145° C. The product (32 parts), has a boiling point—104°–109° C. at 0.1 mm. absolute pressure and a melting point of 45°–48° C. Mixed

Example 3

Hydrogen cyanide (9.5 parts) and 1,2,4,4-tetramethyl-2-pyrrolin-5-one (37 parts) are combined at 0° C. The mixture is allowed to stand at room temperature for one month. The product, 5-cyano-1,3,3,5-tetramethyl-2-pyrolidone, is obtained in 52% yield. The prolonged reaction period is required because after five days only traces of the expected product has been formed.

It is apparent from these experiments that the reaction is indeed both acid and base catalyzed.

Example 4

Hydrogen cyanide (7.7 parts) is added with stirring to 1,2,4,4-tetramethyl-2-pyrrolin-5-one (30 parts). After the mildly exothermic reaction has subsided, sulfuric acid (40 parts) is added dropwise during forty-five minutes. The reaction mixture becomes thick and foamy. The mixture is heated at about 75° C. for two hours. The material is dissolved in cold aqueous 20% sodium hydroxide solution. After the sodium bisulfate is removed by filtration the aqueous solution is extracted with chloroform. A solid (11.5 parts) remains when the chloroform has evaporated. Additional product is isolated by chloroform extraction of the inorganic salt. The product is purified by recrystallization from chloroform and carbon tetrachloride and has a melting point of 179.5°–180° C. The product is 5-carbamoyl-1,3,3,5-tetramethyl-2-pyrrolidinone and has the following analysis: carbon 58.73% (58.67% theoretical), hydrogen 8.77% (8.75% theoretical), and nitrogen 15.05% (15.20% theoretical).

The identification of this product as the amide is confirmed when alkaline hydrolysis with boiling aqueous 10% sodium hydroxide for 30 minutes converts it to 5-carboxy-1,3,3,5-tetramethyl-2-pyrrolidinone having a melting point of 153.0°–153.5° C. The product has a neutral equivalent of 188 (185.2% theoretical) and contains 58.61% carbon (58.33% theoretical), 8.15% hydrogen (8.16% theoretical), and 7.48% nitrogen (7.56% theoretical).

In a manner similar to that of Example 1, there are prepared by reaction with hydrocyanic acid 5-cyano-1-butyl-3,3,5-trimethyl-2-pyrrolidinone from 1-butyl-2,4,4-trimethyl-2-pyrrolin-5-one, 5-cyano-1-cyclohexyl-3,5-dimethyl-3(2,2-dimethylpropyl)2-pyrrolidinone from 1-cyclohexyl-2,4-dimethyl-4(2,2-dimethylpropyl)2-pyrrolin-5-one, 7a-cyano-1-benzyl-3,3-pentamethylene-2,3,3a, 4,5,6,7,7a-octahydroindol-2-one from 1-benzyl-3,3-pentamethylene-2,3,4,5,6,7-hexahydroindol-2-one. The method of Example 2 is applied to the following compounds to give the corresponding hydrocyanic acid reaction products (a) 1-lauryl-2,2,4-trimethyl-2-pyrrolin-5-one gives 5-cyano-1-lauryl-3,3,5-trimethyl-2-pyrrolidinone, (b) 1-octadecyl-2,3-dimethyl-2-pyrrolin-5-one gives 5-cyano-1-octadecyl-4,5-dimethyl-2-pyrrolidinone, (c) 1,4-dimethyl-2,4-bis(2-methylpropyl)-2-pyrrolin-5-one gives 5-cyano-1,3-dimethyl-3,5-bis(2-methylpropyl)-2-pyrrolidinone, and (d) 1-p-tolyl-3,3,6-trimethyl-2,3,4,5,6,7-hexahydroindol-2-one gives 7a-cyano-1-p-tolyl-33,6-trimethyl-2,3,3a,4,5,6,7,7a-octahydroindol-2-one.

Example 5

Hydrogen cyanide (8.5 parts) is added dropwise to a stirred mixture of 1-benzyl-2,4,4-trimethyl-2-pyrrolin-5-one (40 parts) and pyridine hydrochloride (2 parts). The temperature rises 10° C. during this time. After heating at 100° C. for 1.25 hours, distillation gives the product, having a boiling point of 144°–154° C. at 0.6 mm. absolute pressure and a melting point of 68°–70.5° C. It contains 11.50% nitrogen (11.56% theoretical).

The yield of the product, 5-cyano-1-benzyl-3,3,5-trimethyl-2-pyrrolidinone, is 72% of the theoretical.

Example 6

The compound, 1-(2-hydroxyethyl)-2,4,4-trimethyl-2-pyrrolin-5-one, is in equilibrium with 5-oxo-6,6,7a-trimethyl-2,3,5,6,7,7a-hexahydrooxazolo[2,3-a]pyrrole. This equilibrium is shifted to favor the pyrrolinone structure at elevated temperatures. At room temperature conversion to the oxazolopyrrole is virtually complete. This equilibration is speeded by acid catalysis. Addition of hydrocyanic acid to give 5-cyano-1-(2-hydroxyethyl)-3,3,5-trimethyl-2-pyrrolidinone is accomplished starting with either the cyclic or open chain modification as the reactant. Smoothest operation is achieved when hydrocyanic acid is added to the open chain modification either in the absence of a catalyst or in the presence of small amounts of base. Although success is achieved when pyridine hydrochloride is employed with the cyclic modification, a side reaction—polymerization to dimeric and polymeric products, prevents the achievement of consistent results. The preferred procedure for the preparation of 5-cyano-1-(2-hydroxyethyl)-3,3,5-trimethyl-2-pyrrolidinone starting from 5-oxo-6,6,7a-trimethyl-2,3,5,6,7,7a-hexahydrooxazolo[2,3-a]pyrrole is as follows:

The oxazolopyrrole (113 parts) is heated to 253° C. to convert it to an equilibrium mixture which is primarily the open-chain compound, 1-(2-hydroxyethyl)-2,4,4-trimethyl-2-pyrrolin-5-one. The mixture is cooled and then dimethylformamide (50 parts) and sodium methoxide (0.1 part) are added. Hydrocyanic acid (19 parts) is added and the mixture is pumped at 900 p.s.i.g. through a high pressure coil at 250°–260° C. The contact time in the coil is 7.5–8 minutes. The system is flushed with dimethylformamide (26 parts) and the total material put through the system is distilled under reduced pressure. The product has a boiling point of 159°–167° C. at 1.7 mm. absolute pressure. The yield based on starting material consumed is 90%.

Example 7

A mixture of 5-oxo-6,6,7a-trimethyl-2,3,5,6,7,7a-hexahydrooxazolo[2,3-a]pyrrole (90 parts) and pyridine hydrochloride (2 parts) is combined in a creased wall flask and heated to 40° C. in an oil bath. To the mixture is slowly added hydrogen cyanide (17.5 parts). The addition is complete after 25 minutes at 40°–65° C. The reaction is mildly exothermic and a white solid product separates in the course of the addition. The mixture is then heated at 70°–80° C. for 3.5 hours. Distillation of the reaction mixture gives the product (75 parts), which has a boiling point of 149°–159° C. at 0.5 mm. absolute pressure, and an $n_D^{25}$ value of 1.4802. The product $(C_{10}H_{16}N_2O_2)$ contains 14.00% nitrogen (14.28% theoretical).

This procedure was found to be somewhat less satisfactory than the procedure in Example 6 shown above. Hence, 5-cyano-1-ethoxyethyl-3,3,5-trimethyl-2-pyrrolidinone, 5-cyano-1-(3-dimethylaminopropyl)-3,3,5-trimethyl-2-pyrrolidinone, and 5-cyano-1,3-dimethyl-3,5-dihexyl-2-pyrrolidinone are best made by the procedure of Example 6 from 1-ethoxyethyl-2,4,4-trimethyl-2-pyrrolin-5-one, 1-(3-dimethylaminopropyl)-2,4,4-trimethyl-2-pyrrolin-5-one, and 1,4-dimethyl-2,4-dihexyl-2-pyrrolin-5-one, respectively.

Example 8

One very useful purpose which is served by these hydrocyanic acid reaction products is their use as intermediates for the preparation of primary amines which bear pyrrolidinone rings according to the following:

(a) 5-cyano-1,3,3,5-tetramethyl-2-pyrrolidinone (514 parts) and Raney nickel (10 parts) are shaken in a rocking bomb for one hour at 125°–135° C. under a hydrogen atmosphere of 2000 lbs. p.s.i.g. Hydrogen is rapidly absorbed. Distillation of the filtrate after separation of the catalyst gives 5-aminomethyl-1,3,3,5-tetramethyl-2-pyrrolidinone (307 parts) having a boiling point of 112°–114° C. at 2 mm. absolute pressure which freezes in the receiver. The product has a neutral equivalent of 174 (170 theoretical) and contains 16.20% nitrogen (16.46% theoretical).

In a similar manner there are prepared the 5-aminomethyl derivatives which correspond to the 5-cyano derivatives shown following Example 1.

(b) 5-cyano - 1 - (2-hydroxyethyl)-3,3,5-trimethyl-2-pyrrolidinone (520 parts) and Raney nickel catalyst (20 parts) are shaken in a rocking bomb for 2 hours at 135°–141° C. (under a hydrogen atmosphere of 1500 p.s.i.g.). Filtration and distillation gives the corresponding amino product (275 parts), which has a boiling point of 147°–150° C. at 0.5–0.6 mm. absolute pressure and an $n_D^{25}$ value of 1.4966. It solidifies on standing overnight. An additional amount (45 parts) has a boiling point of 150°–172° C. at 0.6–0.7 mm. absolute pressure and is only slightly less pure than the main cut.

The pure product contains 13.80% nitrogen (13.99% theoretical).

In a similar fashion are prepared the compounds which have a 5-aminomethyl group replacing the 5-cyano groups which follow Examples 5, 6, and 7 above.

We claim:

1. A method for the preparation of a compound having the formula

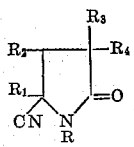

in which $R_1$ taken individually represents a member from the group consisting of alkyl, phenylalkyl, cycloalkyl, phenyl, naphthyl, and alkylphenyl groups of up to 10 carbon atoms, $R_2$ taken individually represents a member from the class consisting of hydrogen and alkyl groups of 1 to 4 carbon atoms, $R_3$ and $R_4$ taken individually represent members from the group consisting of hydrogen and alkyl, cycloalkyl, phenylalkyl, phenyl, naphthyl, and alkylphenyl groups of up to 10 carbon atoms, $R_1$ and $R_2$ taken collectively with the carbon atoms to which they are joined form a member from the class consisting of a carbocyclic ring of 5 to 6 carbon atoms, and said ring having alkyl substituents consisting of a total of up to 4 carbon atoms, $R_2$ and $R_3$ taken collectively with the carbon atoms to which they are joined form a member from the class consisting of a saturated carbocyclic ring of 5 to 6 carbon atoms and said ring having alkyl substituents consisting of a total of up to 4 carbon atoms, $R_3$ and $R_4$ taken collectively with the carbon atoms to which they are joined form a member from the class consisting of a saturated carbocyclic ring of 5 to 6 carbon atoms and said ring having alkyl substituents consisting of a total of up to 4 carbon atoms, and R is a member from the group consisting of alkyl groups of 1 to 18 carbon atoms, alkenyl groups of 3 to 18 carbon atoms, phenyl, naphthyl and phenylalkyl groups of up to 18 carbon atoms, alkylphenylalkyl groups of up to 30 carbon atoms, alkoxyalkyl groups of 3 to 24 carbon atoms, hydroxyalkyl groups of 2 to 12 carbon atoms, and alkylaminoalkyl groups of 3 to 18 carbon atoms, which comprises reacting a compound having the formula

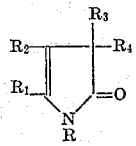

with hydrocyanic acid at a temperature of about 0° to 100° C.

2. A method according to claim 1 in which the reaction is conducted in the presence of a base whose aqueous 0.1 molar solution has a pH of about at least 9.

3. A method for the preparation of a compound having the formula

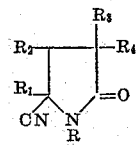

which comprises reacting a compound having the formula

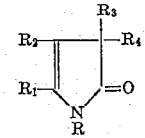

with hydrocyanic acid at a temperature up to 325° C. and under superatmospheric pressure, the temperature and pressure being such that the reactants remain in the liquid phase, said R, $R_1$, $R_2$, $R_3$, and $R_4$ groups being the same as in claim 1.

References Cited in the file of this patent

Kuhling: Ber. Deut. Chem. Ges., vol. 23, pp. 708–9 (1890).

Kuhling et al.: Ber. Deut. Chem. Ges., vol. 38, pp. 1218–23 (1905).

Bashour et al.: J.A.C.S., vol. 57, pp. 178–179 (1935).

Cason et al.: Jour. Org. Chem., vol. 15, p. 853 (1950).